Patented June 25, 1929.

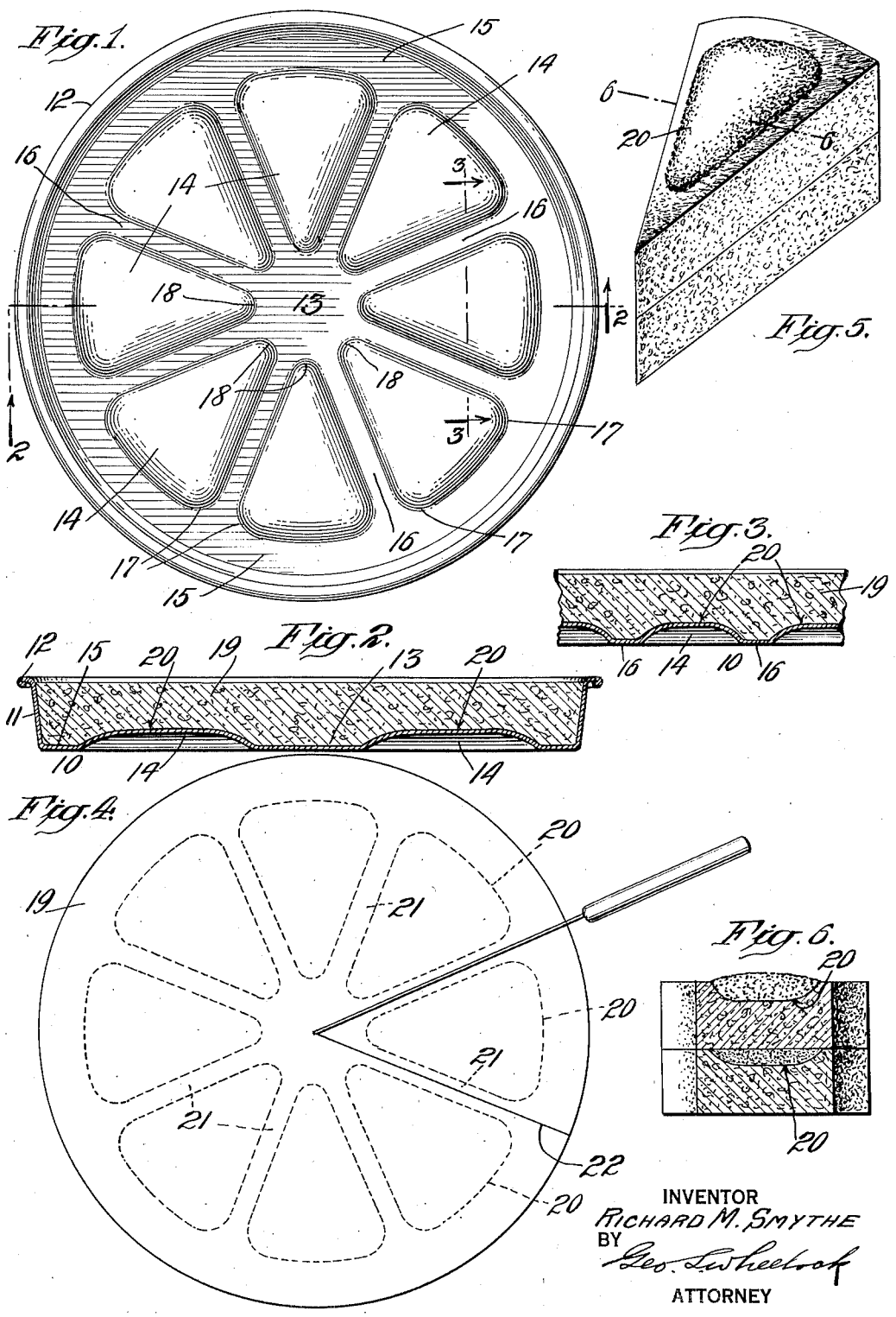

1,718,668

UNITED STATES PATENT OFFICE.

RICHARD M. SMYTHE, OF BOONTON, NEW JERSEY, ASSIGNOR TO JOHN THOMANN, OF BROOKLYN, NEW YORK.

CAKE PLATE.

Application filed March 30, 1928. Serial No. 265,876.

This invention relates to a cake plate which is more especially designed for the baking of a cake which is particularly adapted for receiving fillings of cream, jelly, preserves and the like.

The object of the present invention is to enable the cook to overcome the objections to the usual run of cakes which are coated in layers or otherwise with jellies, preserves, etc., in that with such usual run of those cakes, slices cut from a cake may be more or less smeary and unsightly, because the slicing knife not only cuts through the cake, but through the jelly, preserves, etc., thus smearing the knife at each cut.

An object of the present invention therefore is to enable such cakes to be sliced, by cutting, not through the cake and the filling, but only through the cake itself, so that each slice shall constitute an article of food wherein the filling is entirely sealed within the slice and is not exposed at the edges thereof.

These and other objects are accomplished by the present improved cake plate which comprises a plate body having spaced raised portions struck up therein, the area of each of such raised portions being of a size so as to enable a slice to be cut from the cake at intervals, without cutting into a pocket of the cake which was formed by one of the raised portions in baking the cake.

These being among the objects of the present invention the same consists in certain features of construction to be hereinafter described and then claimed with reference to the accompanying drawings illustrating a preferred embodiment of the invention, in which:

Figure 1 is a plan of the improved cake plate, of reduced size;

Fig. 2 is a transverse section on the line 2—2, Fig. 1;

Fig. 3 is a detail transverse section on the line 3—3, Fig. 1, or at right angles to the section of Fig. 2;

Fig. 4 is a plan of a layer cake such as may be baked on the plate of Fig. 1, showing that a slice may be cut from the cake without cutting through the fillings which are indicated in broken lines;

Fig. 5 is a perspective view of a slice of cake in which a top filling is illustrated, and Fig. 6 is a transverse section on the line 6—6, Fig. 5, showing two fillings in the layer cake of Fig. 5.

Referring to the drawings, the plate body 10 of the plate may have a deep rim 11 provided with an edge bead 12. The rim 11 flares away from the plate body 10 so as to facilitate removal of the cake after it has been baked. Around the preferably imperforate central portion 13 of the plate body 10 there is disposed a series of spaced raised portions 14 which are struck up from the body of the plate, if the plate be of metal, but if of glass, these raised portions would be preferably molded therein. These raised portions are of quite low height as compared with the height of the rim, their upper surfaces being preferably considerably below the level of the upper edge of the rim.

The improved plate may be of any suitable shape, rectangular for example, but the plate illustrated is circular and hence the series of spaced raised portions 14 extend annularly around the center of the plate. Between the outer ends of the raised portions 14 and the edge of the plate body 10, the plate has an annular plane portion 15, the portions 14 being raised above the plane of the surrounding portion 15, and likewise above the central portion 13, as well as above intervening spacing portions 16 which extend, in a circular plate, radially from the center thereof. These spacing portions 16 define the distances between the raised portions 14. Preferably the planes of the plain central and annular portions 13, 15, respectively, are the same.

When the plate is circular, it is preferred to lay out the raised portions 14 so that they shall be of ample size, shape and proportions consistent with the purpose for which the plate is intended. The area of each raised portion should preferably be of greater extent in its two dimensions than its height.

Therefore the plate shown being circular each raised portion tapers gradually from its outer end to its inner end, which is closest to the center of the plate, and the separating portions 16 are substantially straight like the spokes of a wheel, and in a full sized plate would each be of say one-half inch or more in width. Each raised portion 14 is preferably formed so as to curve gradually down to the plane of the main body of the plate, and the central area of each may be substantially flat, as shown in Figs. 2 and 3. Preferably also the three corners 17—17, 18 of each wedge-shaped or generally triangular-shaped raised portion are rounded, as shown in Fig. 1.

A cake 19 is shown as having been baked in the plate, Fig. 2, and such cake will have its bottom portion formed with an annular series of pockets 20, coinciding with the raised portions 14 of the plate. In Fig. 4 a layer cake is shown which may consist of two or more layers, and the pockets 20 formed in the adjacent layers will be registered in opposition and filled with suitable fillings of jelly, cream, preserves, etc. As the upper layer of this particular cake has its pockets facing inwardly, these pockets are indicated in broken lines in Fig. 4, and when such a layer cake is built up the pockets 20 will be one above the other, in substantial alignment, and the pockets of each series will be spaced apart from each other by radial solid portions 21 of the cake, and these solid portions will extend away from the center of a circular cake and the cake portions 21 will be one above the other. It will be clear from Fig. 4 that when a knife is used to cut out a slice from the center of the cake outwardly, that the cuts such as 22 will pass through solid portions of the cake and will not cut through the fillings. In consequence of this each slice will have its filling sealed up within it, and while it will be a filled slice it will not be messy, nor will the knife be messy, nor will the slice be inconvenient and distasteful in handling.

Referring to Figs. 5 and 6, a modified form of layer cake is shown in which the filled pockets 20 are not arranged in matching opposition to each other, but each layer of the slice will have its own individual filling, somewhat like a tart. Of course if a layer cake is built up along the lines of Figs. 5 and 6 it is easier to see that the solid cake portions 21 of Fig. 4 match, but if the layers are so built up as to cause the pockets to face each other, as in Fig. 4, greater care will probably have to be taken in making such layer cake.

Various modifications will suggest themselves to those skilled, and therefore the invention is not limited to the particular construction shown and described, for such modifications could still be within the spirit of the invention and not depart from the scope of the appended claims.

What I claim as new, is:

1. A cake plate, comprising a plate body having struck-up therein spaced raised portions, the area of each of which is of greater extent in its two dimensions than the height of such portion, whereby the areas of the raised portions are of a size sufficient to produce a series of substantial shallow pockets in a cake baked on the plate, and all the spaces between the raised portions being along substantially straight lines and relatively narrow as compared with the areas, whereby suitable intervals are made in a baked cake to allow of slicing the cake without cutting into a pocket, and an upward rim surrounding and substantially spaced away from the raised portions.

2. A cake plate comprising a circular plate body having struck-up therein a series of spaced raised portions around the center thereof, the central portion of the plate being imperforate and relatively lower than the raised portions, whereby to separate them, and the raised portions extending outwardly from the central portion.

3. A cake plate comprising a circular plate body having struck up therein a series of spaced raised portions around the center thereof, the central portion of the plate being imperforate and relatively lower than the raised portions, whereby to separate them, each raised portion extending in length radially of the central portion, and the plate being provided with an annular portion surrounding the raised portions, the plane of the annular portion being substantially that of the central portion.

4. A cake plate, comprising a circular plate body having struck up therein a series of spaced raised portions around the center thereof, and each raised portion extending in length radially of the center and being of tapering shape lengthwise, with the smaller ends toward the center; said raised portions being of relatively large area as compared with the width of the spaces between them.

5. A cake plate, comprising a circular plate-body having struck up therein an annular series of equally spaced raised portions of tapering form and the smaller ends of which are the closest to the center of the plate body, the intervening spacing portions of the body being of a width narrower than that of the raised portions, and the plate having its central portion plain and being provided with a surrounding annular portion, the central portion and the annular portion being in substantially the same plane with each other, and the plate having an upwardly extending rim, between which and the raised portions the said annular portion is disposed.

6. A cake plate comprising a circular plate body provided with an annular rim, the plate body having struck up therefrom a series of spaced raised portions around the center thereof, the central portion of the plate being relatively lower than the raised portions, the plate having an annular plain portion of substantial area between the said rim and the raised portions, and the raised portions extending radially between the central portion and the annular portion surrounding them.

RICHARD M. SMYTHE.